United States Patent
George et al.

(10) Patent No.: US 7,984,282 B2
(45) Date of Patent: Jul. 19, 2011

(54) EVASION OF POWER ON SELF TEST DURING AN OPERATING SYSTEM INITIATED REBOOT

(75) Inventors: Renjith Puthenpurackal George, Karnataka (IN); Chandramouli Srinivasan, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 44 days.

(21) Appl. No.: 12/398,184

(22) Filed: Mar. 5, 2009

(65) Prior Publication Data

US 2010/0185844 A1 Jul. 22, 2010

(30) Foreign Application Priority Data

Jan. 21, 2009 (IN) .............................. 135/CHE/2009

(51) Int. Cl.
*G06F 9/00* (2006.01)
*G06F 9/24* (2006.01)
*G06F 15/177* (2006.01)
(52) U.S. Cl. ................................................ 713/1; 713/2
(58) Field of Classification Search .................... 713/1, 2
See application file for complete search history.

(56) References Cited

U.S. PATENT DOCUMENTS

| | | | | |
|---|---|---|---|---|
| 6,158,000 A | * | 12/2000 | Collins | 713/1 |
| 6,393,586 B1 | * | 5/2002 | Sloan et al. | 714/25 |
| 6,434,696 B1 | * | 8/2002 | Kang | 713/2 |
| 6,434,697 B1 | * | 8/2002 | Leyda et al. | 713/2 |
| 6,721,881 B1 | * | 4/2004 | Bian et al. | 713/1 |
| 6,721,885 B1 | * | 4/2004 | Freeman et al. | 713/2 |
| 6,807,643 B2 | * | 10/2004 | Eckardt et al. | 714/36 |
| 2002/0184483 A1 | * | 12/2002 | Morrison et al. | 713/2 |
| 2004/0181656 A1 | * | 9/2004 | Stern et al. | 713/1 |
| 2006/0294352 A1 | * | 12/2006 | Morrison et al. | 713/1 |

* cited by examiner

*Primary Examiner* — Mark Connolly

(57) ABSTRACT

A system and method to evade the power on self test during an operating system initiated reboot is disclosed. In one embodiment, a method for optimizing reboot process of a computer includes determining a status of a power on self test (POST) performed during a prior booting of the computer when an operating system (OS) initiated rebooting of the computer is triggered, loading information obtained during the POST of the prior booting of the computer into a basic input output system (BIOS) of the computer if the status of the POST performed during the prior booting of the computer indicates a success of the POST, and performing the rebooting of the computer using the information, wherein a subsequent POST associated with the rebooting of the computer is skipped during the rebooting of the computer.

13 Claims, 5 Drawing Sheets

EVASION OF POWER ON SELF TEST DURING AN OPERATING SYSTEM INITIATED REBOOT

RELATED APPLICATIONS

Benefit is claimed under 35 U.S.C. 119(a)-(d) to Foreign application Serial No. 135/CHE/2009 entitled "EVASION OF POWER ON SELF TEST DURING AN OPERATING SYSTEM INITIATED REBOOT" by Hewlett-Packard Development Company, L.P., filed on 21 Jan. 2009, which is herein incorporated in its entirety by reference for all purposes.

BACKGROUND

In computing, booting a bootstrapping process starts an operating system (OS) when the user turns on a computer system. A basic input output system (BIOS) refers, in part, to a firmware code run by a computer when first powered on to identify and initialize system component hardware to prepare the computer for the booting. A power on self test (POST) is a diagnostic testing sequence that the BIOS runs to determine if the system component and/or peripheral hardware are working correctly.

The boot process for the OS may take a while due to the POST being performed (e.g., for several minutes) during which each system component hardware gets initialized (e.g., as per desktop management interface (DMI) standard for specification of the BIOS). The time delay may be compounded when the POST is performed every time when the computer is rebooted. For instance, a web server or a database server with a number of internal devices and/or coupled to many peripheral devices may suffer from the slowing down of the OS initiated rebooting of the computer. Furthermore, for a test server, which is frequently rebooted for application, software, OS, hardware, driver, firmware, functionality, and/or other types of testing, there is much time being wasted due to the redundant nature of the POST.

BRIEF DESCRIPTION OF THE DRAWINGS

Embodiments of the present invention are illustrated by way of an example and not limited to the figures of the accompanying drawings, in which like references indicate similar elements and in which.

Other features of the present embodiments will be apparent from the accompanying drawings and from the detailed description that follows.

DETAILED DESCRIPTION

Evasion of power on self test (POST) during an operating system (OS) initiated reboot is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1A:
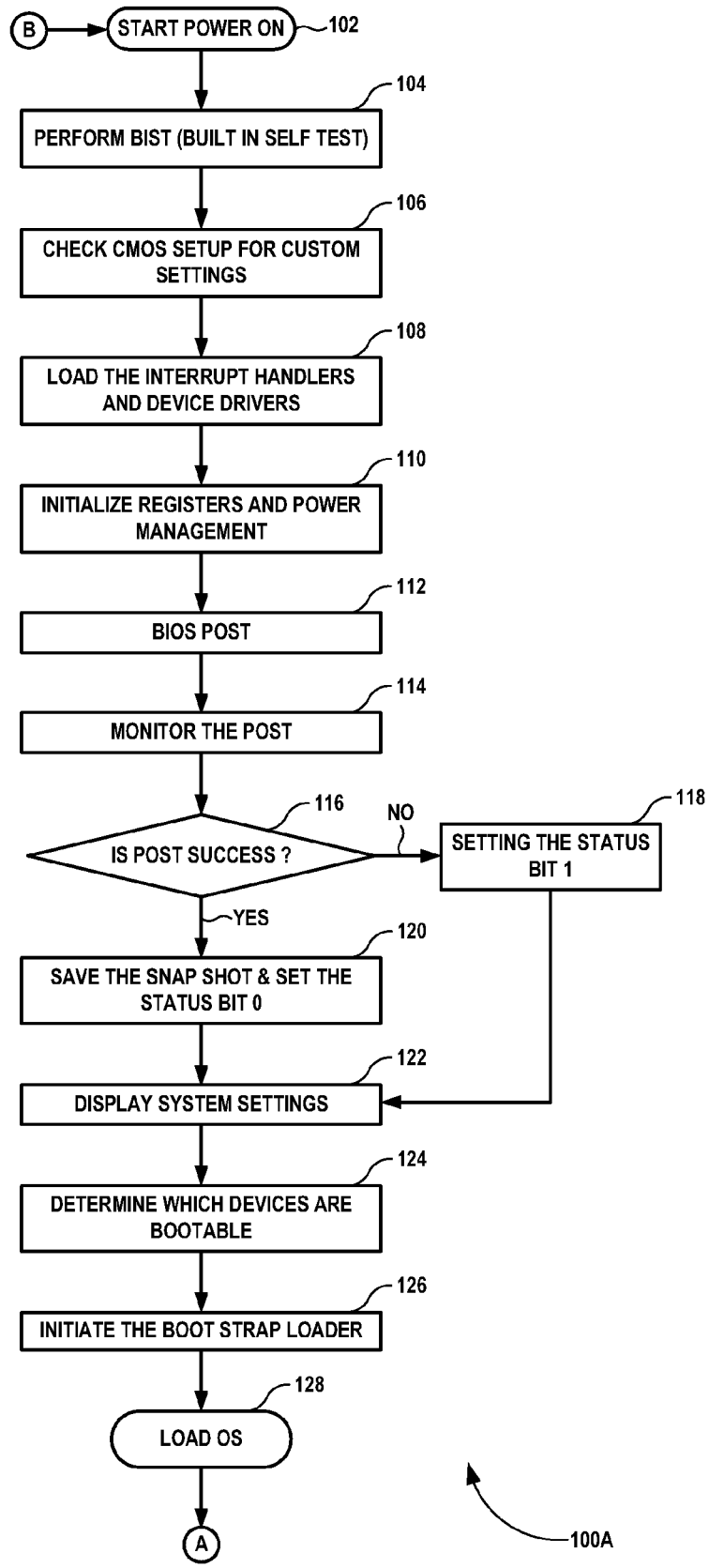
FIGS. 1A and 1B are a flow chart for performing an exemplary reboot process, according to one embodiment.
Figure 1B:
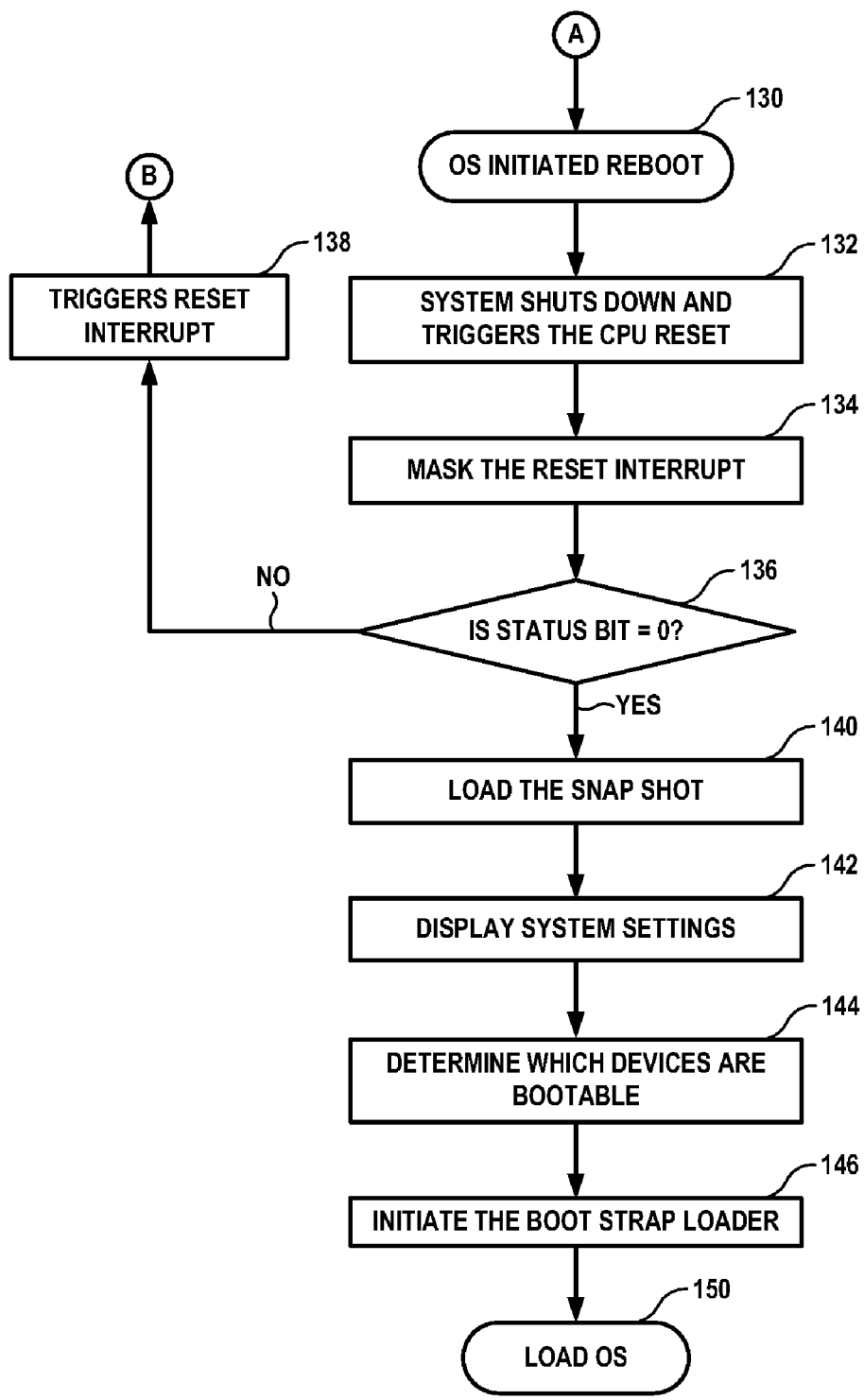

FIGS. 1A and 1B are a flow chart for performing an exemplary reboot process, according to one embodiment. In step 102, a computer is powered on. In one example embodiment, the computer includes a personal computer (PC), a desktop, a laptop, a personal digital assistant (PDA), a workstation, a server, a mainframe, a wearable computer, a supercomputer, and/or a minicomputer. In step 104, a built in self test (BIST) is performed on the computer to check functioning of components such as electronic components, registers, memory devices, interpreters and so on associated with the computer.

In step 106, a complementary metal oxide semiconductor (CMOS) setup is checked for custom settings. For example, the custom settings may include setting system time, setting boot priority, enabling or disabling of the components, and the like. For example, if a floppy drive associated with the computer is not used, then it can be disabled in the BIOS level itself. In step 108, interrupt handlers and device drivers are loaded. In these embodiments, the devices associated with the computer such as display cards, memory devices, other add on cards such as keyboard and mouse, and other input/output (I/O) devices such as printers and scanners are initialized.

In step 110, initializing registers and power management is performed. For example, devices having different voltage levels such as a printer with 3V, accelerator graphics card with 1.5V, USB devices with 5V, and so on are managed using the step 110. In step 112, a basic input output system (BIOS) power on self test (POST) is performed. In step 114, the computer performing the POST is monitored. In one example embodiment, the monitoring is performed to determine the functioning of the devices in the system, power required for the system, structure of hardware components in the system and so on.

In step 116, a check is made to determine whether the status of the POST performed during the booting of the computer was successful or not. In step 118, the status bit is set to "1" if the status bit for the status of the POST performed during the booting of the computer indicates a failure of the POST and the process goes to step 122. In step 120, a status bit for the status of the POST performed during the booting of the computer is set to "0" if the status bit for the status of the POST indicates a success of the POST and a snapshot is saved. In one example embodiment, the snapshot may be a database or inventory generated by the POST performed during the prior booting of the computer. Additionally, the snapshot may refer to information obtained during the POST of the booting of the computer.

In accordance with the steps 114 to 120, the POST is monitored and the information (e.g., snap shot) is saved into the extended BIOS (e.g., the first flash memory). Further, a status bit (e.g., evade BIOS POST (EBP)) is set to 1/0 in a predefined location of the second flash memory (e.g., 1 is for failed POST and 0 is for successful POST).

In step 122, the system settings are displayed. In step 124, the devices that are to be booted are determined based on the information. In step 126, the boot strap loader is initiated. In step 128, operating system (OS) is loaded in to the computer. In step 130, the OS initiated reboot of the computer is triggered. In step 132, the computer/system is shut down and the CPU reset is triggered. In one example embodiment, the computer needs to be restarted to initiate new drivers/functions when the OS initiated reboot of the computer is triggered.

In step 134, a reset interrupt is masked to a processor of the computer and the status bit is accessed. In these embodiments, the OS is not allowed to reboot the computer hardware. For example, if the previous POST was not successful, the hardware associated with the failed POST needs to be re-booted/initialized again. Further, the OS does not checks the computer hardware again for which the previous POST (e.g., as shown in step 116 of FIG. 1A) is successful. Therefore, step 136 is performed to determine whether the status bit is "0" or "1". In step 136, the status of the power on self test (POST) performed during a prior booting of the computer is determined when an operating system (OS) initiated rebooting of the computer is triggered.

In step 138, the reset interrupt is triggered if the status bit is 1 (e.g., failed POST) and the process 100B goes to the step 102 of 100A. In these embodiments, the processor of the computer is reset if the status bit is 1. It can be noted that, in case of any H/W failure while the OS is up and running, the process 100B resets the EBP status bit (e.g., status bit=1).

In step 140, information (e.g., the snap shot) obtained during the POST of the prior booting of the computer is loaded into a basic input output system (BIOS) of the computer if the status of the POST performed during the prior booting of the computer indicates a success of the POST. In one example embodiment, if the status bit is 0 (e.g., successful POST), the backed up information from the first flash memory is loaded and memory reset is initiated. In step 142, the system settings are displayed. In step 144, the devices that are to be re-booted are determined. In one example embodiment, the rebooting of the computer is performed using the information. In one embodiment, a subsequent POST associated with the rebooting of the computer is skipped during the rebooting of the computer. For example, the subsequent POST associated with the rebooting of the computer is skipped if the corresponding previous POST (e.g., as shown in step 116 of FIG. 1A) is successful. In step 146, the boot strap loader is initiated. In step 150, the OS is loaded into the computer.

Figure 2:
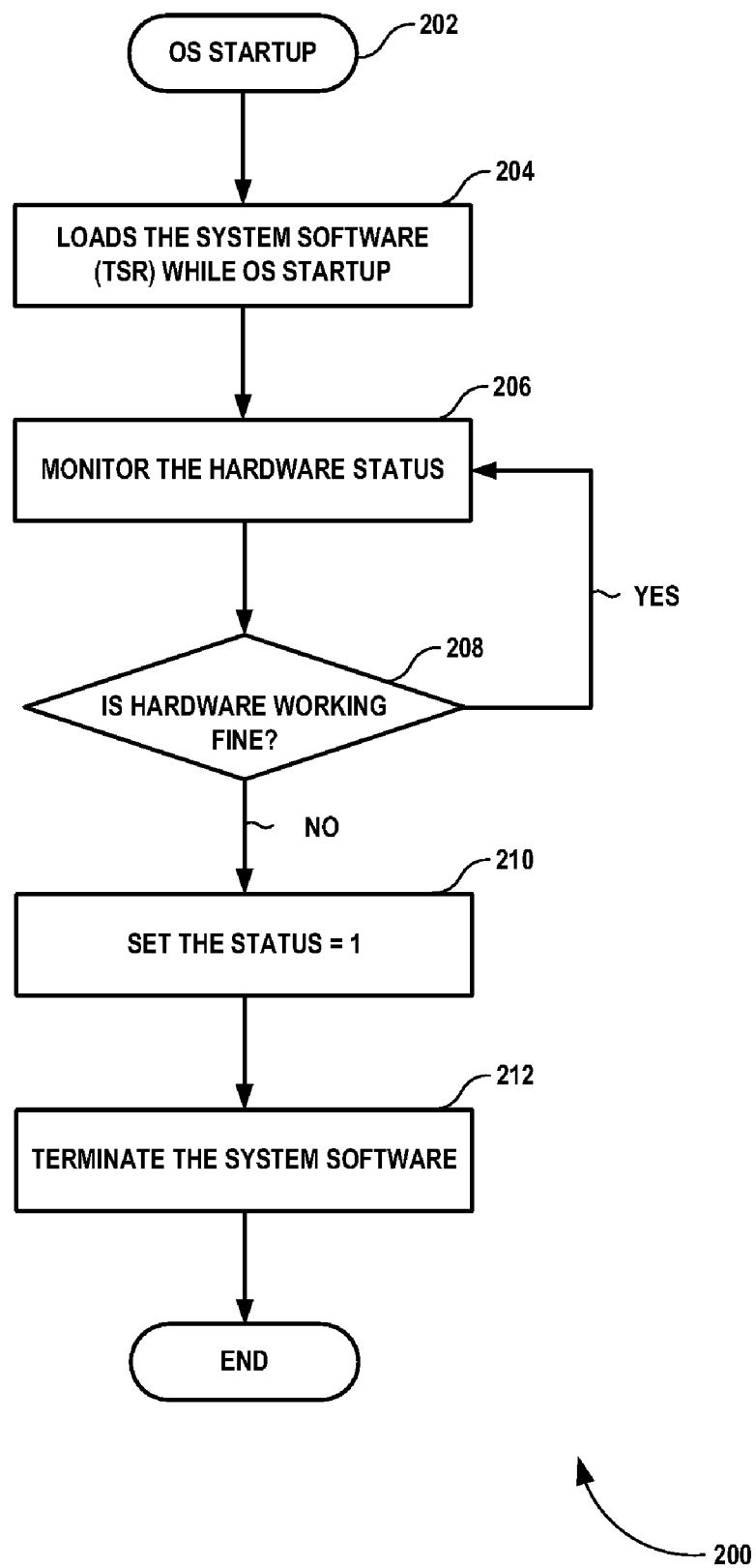
FIG. 2 is a flow chart for continuously monitoring a status of change in hardware associated with a computer, according to one embodiment.

FIG. 2 is a flow chart 200 for continuously monitoring a status of change in hardware associated with a computer, according to one embodiment. In step 202, the OS is started up. In step 204, a terminate and stay resident (TSR) program is loaded while the OS is starting up. In step 206, respective hardware devices coupled to the computer are continuously monitored. In one example embodiment, the monitoring the hardware is performed using the terminate and stay resident (TSR) installed in the OS. For example, the hardware devices include drive controllers, hard disk drives (HDDs), network interface cards (NICs), display adapters, input output (IO) controllers, etc. In one exemplary implementation, the devices are continuously monitored through interaction of each device with the OS, drivers and the individual firmware associated with that particular hardware(s).

In step 208, a check is made to determine whether the hardware is working fine or not. If the hardware is working fine, then the process 200 goes to step 206. In step 210, the status bit is reset to 1 in response to a change in the hardware. In one example embodiment, the change in the hardware includes an addition of a new hardware device, a removal of an existing hardware device, and/or a failure in the existing hardware device. In step 212, the TSR installed in the OS is terminated.

Figure 3:
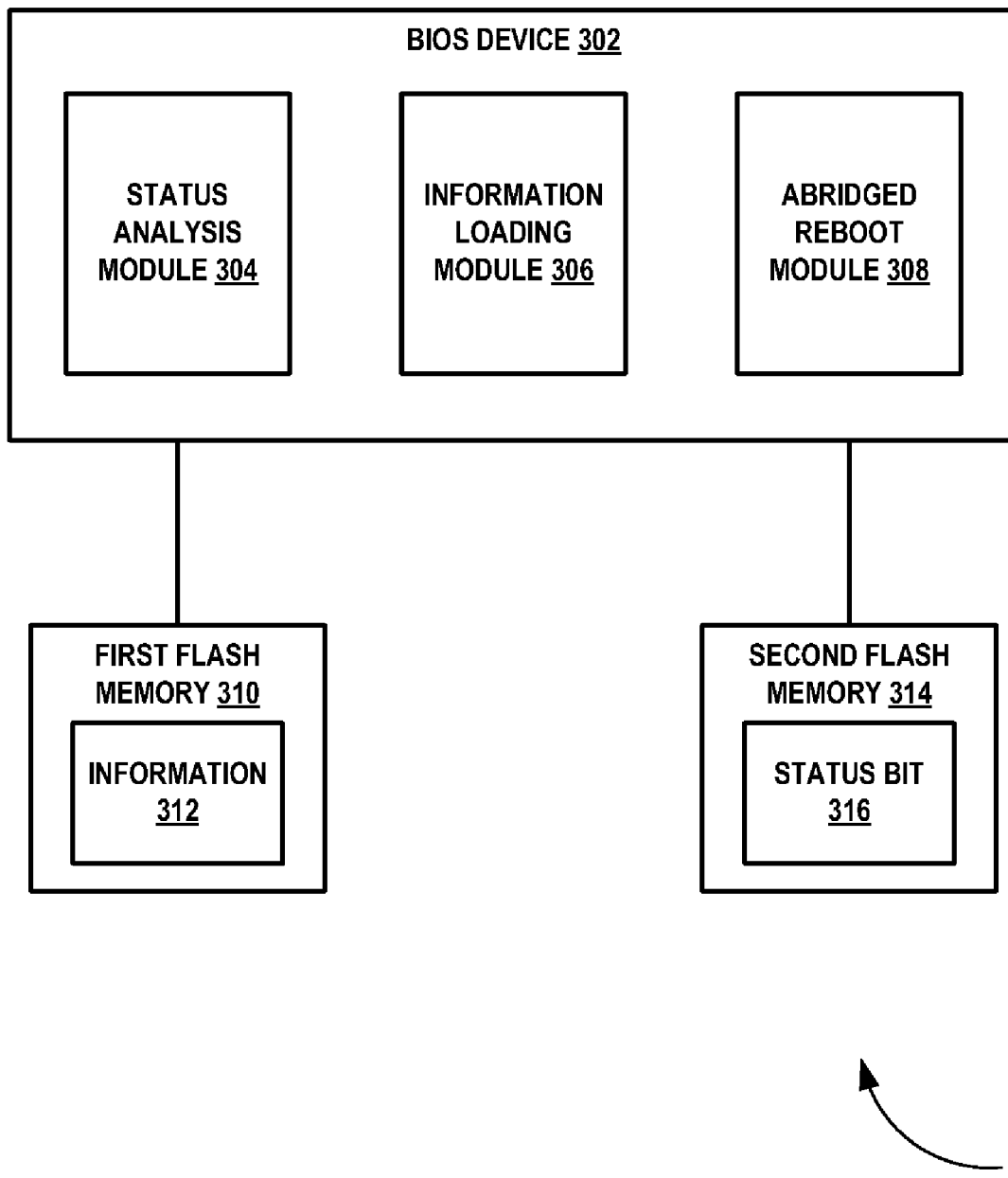
FIG. 3 is a basic input output system (BIOS) chip for performing an exemplary reboot process, according to one embodiment.

FIG. 3 is a basic input output system (BIOS) chip 300 for performing an exemplary reboot process, according to one embodiment. Particularly, FIG. 3 illustrates a BIOS device 302 including a status analysis module 304, an information loading module 306, and an abridged reboot module 308 for optimizing reboot process of a computer. Further, the BIOS chip 300 includes a first flash memory 310, and a second flash memory 314.

In operation, the status analysis module 304 determines the status of the POST performed during the prior booting of the computer when an OS initiated rebooting of the computer is triggered. In one exemplary implementation, the status of the POST performed during the prior booting of the computer is updated by a terminate and stay resident (TSR) installed on the OS.

Further, the information loading module 306 loads information 312 obtained during the POST of the prior booting of the computer into the BIOS of the computer if the status of the POST performed during the prior booting of the computer indicates a success of the POST. Furthermore, the abridged reboot module 308 performs the rebooting of the computer using the information 312. In one embodiment, a POST associated with the rebooting of the computer is skipped during the rebooting of the computer. Further in operation, the information 312 is stored in the first flash memory 310, and the status is stored as a bit (e.g., the status bit 316) in the second flash memory 314.

Figure 4:
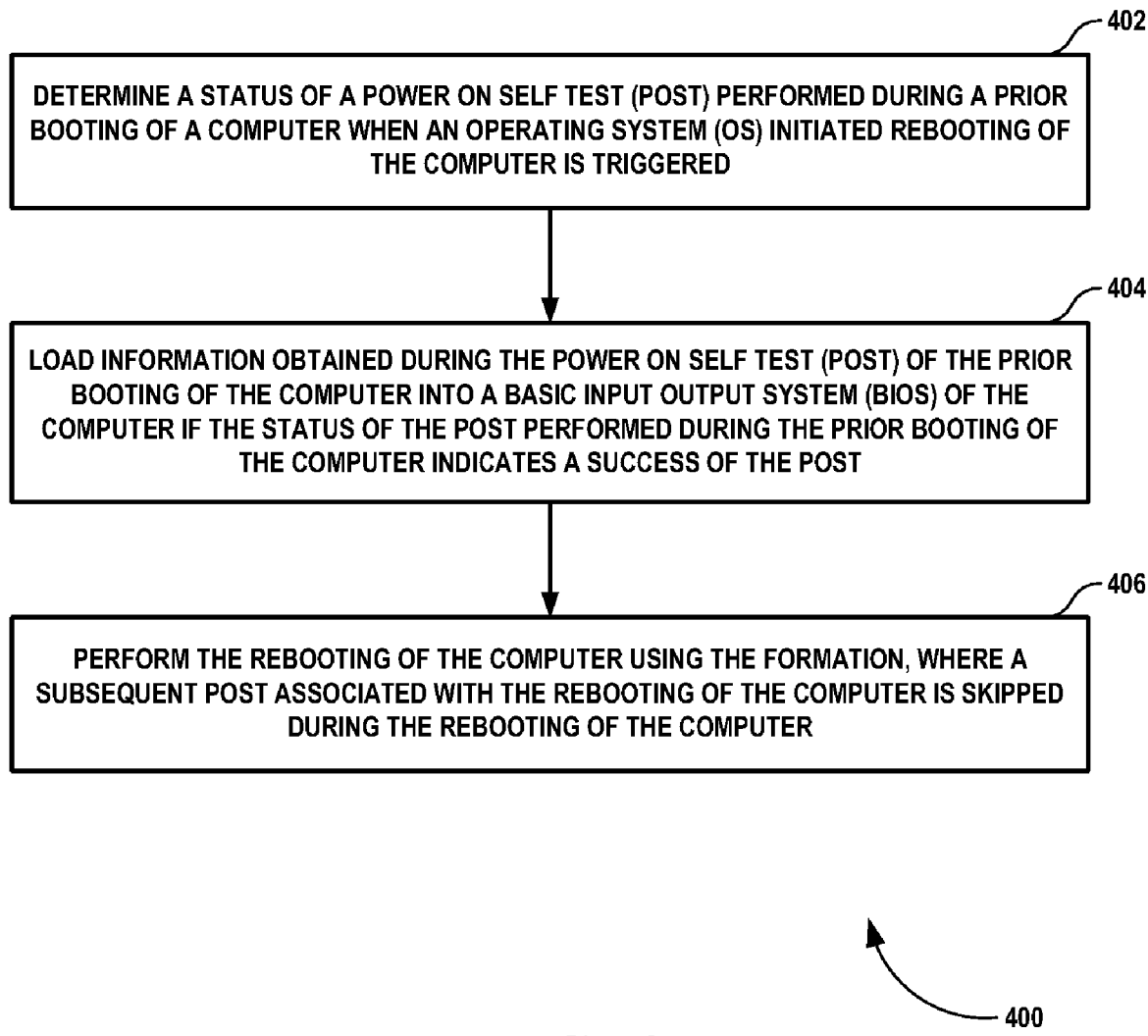
FIG. 4 is a process flow chart 400 of an exemplary method for optimizing reboot process of a computer, according to one embodiment.

FIG. 4 is a process flow chart 400 for an exemplary method for optimizing reboot process of a computer, according to one embodiment. For example, the computer includes a PC, a desktop, a laptop, a PDA, a workstation, a server, a mainframe, a wearable computer, a supercomputer, and a minicomputer. In step 402, a status of a power on self test (POST) performed during a prior booting of the computer is determined when an operating system (OS) initiated rebooting of the computer is triggered. In one example embodiment, the determining the status of the POST performed during the prior booting of the computer further Includes masking a reset interrupt to a processor of the computer, and accessing the status bit. In one exemplary implementation, the processor of the computer is reset if the status bit is 1.

In one exemplary implementation, a status bit for the status of the POST performed during the prior booting of the computer is set to "0." Further, the status bit is set to "1" if the status bit for the status of the POST performed during the prior booting of the computer indicates a failure of the POST.

In step 404, information obtained during the power on self test (POST) of the prior booting of the computer is loaded into a basic input output system (BIOS) of the computer if the status of the POST performed during the prior booting of the computer indicates a success of the POST. In one example embodiment, the information includes a snapshot of boot initialization data generated by the POST performed during the prior booting of the computer.

In step 406, the rebooting of the computer is performed using the information. In one embodiment, a subsequent POST associated with the rebooting of the computer is skipped during the rebooting of the computer. Further, respective hardware devices coupled to the computer are continuously monitored. In one exemplary implementation, the monitoring the hardware is performed using a terminate and stay resident (TSR) installed in the OS. In addition, the status bit is reset in response to a change in the hardware. In one example embodiment, the change in the hardware includes an addition of a new hardware device, a removal of an existing hardware device, and/or a failure in the existing hardware device.

A computer readable medium for optimizing reboot process of a computer having instructions that, when executed by a computer, cause the computer to perform the method of FIG. 4.

The above mentioned method results in fast boot times of PCs/servers by extending the current functionalities of BIOS & Operating system. Further, no additional hardware is required to achieve the above mentioned functionality thereby reduced implementation cost. The above mentioned method further provides flexibility to enable or disable the above mentioned feature based on customer requirements. The above mentioned method is compatible to implement across reduced instruction set computing (RISC)/complex instruction set computing (CISC) architectures.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuitry (ASIC)).

What is claimed is:

1. A method for optimizing reboot process of a computer, comprising:
    determining a status of a power on self test (POST) performed during a prior booting of the computer when an operating system (OS) initiated rebooting of the computer is triggered, wherein the status of the POST performed during the prior booting of the computer is updated by a terminate and stay resident (TSR) installed on the OS;
    loading information obtained during the POST of the prior booting of the computer into a basic input output system (BIOS) of the computer if the status of the POST performed during the prior booting of the computer indicates a success of the POST, wherein the information comprises a snapshot of boot initialization data generated by the POST performed during the prior booting of the computer; and
    performing the rebooting of the computer using the information, wherein a subsequent POST associated with the rebooting of the computer is skipped during the rebooting of the computer.

2. The method of claim 1, wherein a status bit for the status of the POST performed during the prior booting of the computer is set to "0."

3. The method of claim 2, wherein the status bit is set to "1" if the status bit for the status of the POST performed during the prior booting of the computer indicates a failure of the POST.

4. The method of claim 2, further comprising:
    continuously monitoring respective hardware devices coupled to the computer; and
    resetting the status bit in response to a change in the hardware.

5. The method of claim 4, wherein the monitoring the hardware is performed using the TSR installed in the OS.

6. The method of claim 4, wherein the change in the hardware comprises an addition of a new hardware device, a removal of an existing hardware device, and a failure in the existing hardware device.

7. The method of claim 1, wherein the computer comprises a personal computer (PC), a desktop, a laptop, a personal digital assistant (PDA), a workstation, a server, a mainframe, a wearable computer, a supercomputer, and a minicomputer.

8. A method for optimizing reboot process of a computer, comprising:
    determining a status of a power on self test (POST) performed during a prior booting of the computer when an operating system (OS) initiated rebooting of the computer is triggered, wherein the determining the status of the POST performed during the prior booting of the computer further comprises:
        masking a reset interrupt to a processor of the computer; and
        accessing a status bit;
    loading information obtained during the POST of the prior booting of the computer into a basic input output system (BIOS) of the computer if the status of the POST performed during the prior booting of the computer indicates a success of the POST; and
    performing the rebooting of the computer using the information, wherein a subsequent POST associated with the rebooting of the computer is skipped during the rebooting of the computer.

9. The method of claim 8, wherein the processor of the computer is reset if the status bit is 1.

10. A BIOS device for optimizing reboot process of a computer, comprising:
    a status analysis module for determining a status of a power on self test (POST) performed during a prior booting of the computer when an operating system (OS) initiated rebooting of the computer is triggered, wherein the status of the POST performed during the prior booting of the computer is updated by a terminate and stay resident (TSR) installed on the OS;
    an information loading module for loading information obtained during the POST of the prior booting of the computer into a basic input output system (BIOS) of the computer if the status of the POST performed during the prior booting of the computer indicates a success of the POST, wherein the information comprises a snapshot of boot initialization data generated by the POST performed during the prior booting of the computer; and
    an abridged reboot module for performing the rebooting of the computer using the information, wherein a POST associated with the rebooting of the computer is skipped during the rebooting of the computer.

11. The device of claim 10, wherein the information is stored in a first flash memory.

12. The device of claim 11, wherein the status is stored as a bit in a second flash memory.

13. A non-transitory computer readable medium for optimizing reboot process of a computer having instructions that, when executed by a computer, cause the computer to perform a method comprising:

determining a status of a power on self test (POST) performed during a previous booting of the computer when an operating system (OS) initiated rebooting of the computer is triggered, wherein the status of the POST performed during the previous booting of the computer is updated by a terminate and stay resident (TSR) installed on the OS;

loading information obtained during the POST of the previous booting of the computer into a basic input output system (BIOS) of the computer of the POST, wherein the information comprises a snapshot of boot initialization data generated by the POST performed during the previous booting of the computer; and rebooting the computer using the information and skipping a subsequent POST associated with the rebooting of the computer.

\* \* \* \* \*